United States Patent

Goodfellow

[15] 3,707,315
[45] Dec. 26, 1972

[54] ROTARY CUTTER FOR EXCAVATION, ESPECIALLY FOR USE WITH RAISE BORING AND TUNNEL BORING MACHINES

[72] Inventor: Robert D. Goodfellow, Bedford, Pa.
[73] Assignee: Subterranean Tools Inc., Beaumont, Tex.
[22] Filed: Feb. 2, 1971
[21] Appl. No.: 111,924

[52] U.S. Cl. .................308/8.2, 308/15, 308/187.1, 308/209, 308/210, 308/216
[51] Int. Cl.......F16c 19/38, F16c 33/76, F16c 35/06
[58] Field of Search.........308/8.2, 15, 211, 210, 209, 308/207 R, 216, 187.1

[56] References Cited

UNITED STATES PATENTS

| 3,550,972 | 12/1970 | Coski | 308/8.2 |
| 3,494,682 | 2/1970 | Keller | 308/187.1 |
| 3,216,513 | 11/1965 | Robbins et al. | 308/8.2 |
| 3,449,024 | 6/1969 | Lichte | 308/8.2 |

FOREIGN PATENTS OR APPLICATIONS

| 1,199,873 | 12/1959 | France | 308/187.1 |

Primary Examiner—Martin P. Schwadron
Assistant Examiner—Barry Grossman
Attorney—Melvin A. Crosby

[57] ABSTRACT

The specification discloses a rotary cutter, especially for use on tunnel boring or raise boring machines, for reducing formations to be excavated in which a rotary cutter body is rotatably supported on a nonrotatable central structure by special antifriction bearing means particularly characterized in the employment of a single ring for the outer race of both of a pair of antifriction bearings on which the cutter body is supported.

7 Claims, 1 Drawing Figure

PATENTED DEC 26 1972 3,707,315
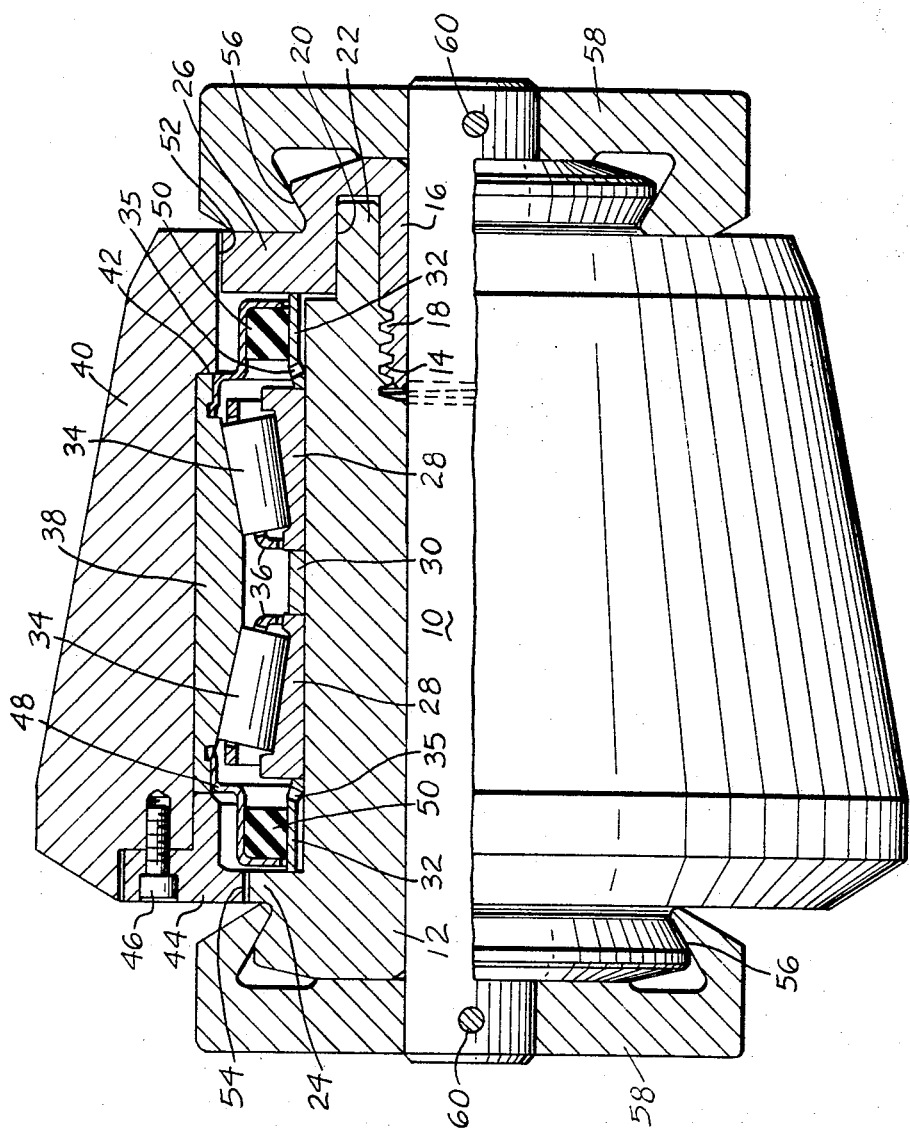
INVENTOR.
ROBERT D. GOODFELLOW
BY

ROTARY CUTTER FOR EXCAVATION, ESPECIALLY FOR USE WITH RAISE BORING AND TUNNEL BORING MACHINES

The present invention relates to rotary cutters, especially for use on raise boring and tunnel boring machines, and is especially concerned with a novel bearing arrangement for use with such cutters.

Cutters for tunnel boring and raise boring machines comprise a central nonrotatable supporting structure in a cutter body rotatably supported thereon which rolls on the formation being treated while being pressed thereagainst. Due to the severe loading encountered in respect of such cutters, the journaling of the rotary cutter body on the stationary supporting part therefor is extremely important.

It is also important to maintain as much section as is possible in the cutter body and in the central supporting structure, and for these reasons, it has been common practice heretofore to interpose needle bearings between the cutter body and the support while providing a single row of ball bearings between the cutter and the support in about the middle of the length thereof to hold the cutter body against axial movement on the support.

The races for the needle bearings and ball bearings are provided directly on the inner support and on the inside of the cutter body so as to maintain the sections thereof at the maximum value and this requires an extremely close machining practice to obtain good life with cutter arrangements of this nature.

The present invention proposes to employ antifriction bearings between the cutter body and the support, which anti-friction bearings comprise inner and outer races and rollable elements therebetween and, in particular, wherein two rows of the rolling elements are employed while a single ring forms the outer race for the two bearings represented by the two rows of rollable elements.

By constructing a cutter in the aforesaid manner, the strength of the cutter body and support are maintained high and the single ring forming the outer race of the antifriction bearing adds a substantial amount of support to the cutter body, particularly in the central region thereof which, heretofore, was somewhat weakened by the groove provided therein for the ball bearings.

The arrangement of the present invention is, furthermore, sealed off so that the space in which the bearings are mounted will retain lubricant and remain free of contaminating foreign material which, in the case of cutters of the nature referred to, is quite often of an abrasive nature.

The exact nature of the present invention will become more apparent upon reference to the following detailed specification taken in connection with the accompanying drawing which shows, somewhat schematically, a rolling cutter according to the present invention, partly in section.

BRIEF SUMMARY OF THE INVENTION

According to the present invention, there is supported on a central shaft, an inner supporting structure in the form of a pair of elements threaded together and adapted for supporting the inner races of a pair of antifriction bearings.

The pair of antifriction bearings, and which are roller bearings, have outer races which are combined in the form of a single heavy ring which is clamped on the inside of the rotatable cutter body.

Seals are arranged at the opposite ends of the bearing combination to exclude foreign matter from the space occupied by the bearings while retaining lubricant therein.

DETAILED DESCRIPTION OF THE INVENTION

Referring to the drawing somewhat more in detail, the cutter arrangement shown therein comprises a central shaft 10 on which is mounted an inner supporting structure comprising a first cylindrical member 12 having internal threads 14 at one end and a second member 16 having external threads 18 at one end. Advantageously, member 16 has an annular cavity 20 therein and member 12 is formed with a tenon 22 extending into said cavity and serving as locating and load transmitting means.

Member 12 at the end opposite member 16 has a radial flange 24 and, similarly, member 16 has a radial flange 26 facing flange 24.

Contained between flanges 24 and 26 is a pair of anti-friction bearings, roller bearings, specifically, each having an inner race 28 and with a spacer ring 30 interposed therebetween. Disposed between the outer side of each race 28 and the adjacent one of flanges 24 and 26 is a spacer ring 32 which may be provided with an aperture 35 through which lubricant can pass.

It will be evident that the described arrangement permits member 16 to be threaded onto member 12 until the combination of the races 28 and spacer rings 30 and 32 are firmly clamped between flanges 24 and 26. When the races and rings are thus firmly clamped together, member 16 can be locked to member 12 in any desired manner, as by a lock pin or set screws or the like.

Each of the antifriction bearings comprise an annular row of rollers 34 and cages 36 and each antifriction bearing also has an outer race. According to the present invention, the outer races on which rollers 34 roll is formed of a single heavy ring 38 having tapered regions near the opposite ends forming the races proper for the rolls 34. Ring 38 is received inside the cutter body 40 and at one end engages the bottom wall 42 of the counterbore on which ring 38 rests while at the other end of the ring is engaged by a ring 44 held in place on the cutter body by cap screws 46.

According to the present invention, each end of ring 38 is provided with a grooved recess for receiving a somewhat resilient metal ring 48 which engages the radially outer periphery on one axial end of a rubber-like seal ring 50 which, at its radially inner side, rests on the pertaining one of rings 32. The material of the seal rings 50 can be, as mentioned, a rubber-like or elastomeric material such as or Teflon or a silicon rubber or the like. The sealing rings 50 seal the space occupied by the bearings against the ingress of foreign material and likewise serve to retain lubricant in the bearing space.

At the end of body 40 adjacent member 16, the body 40 is provided with a bore 52 closely fitting about the periphery of flange 26 and thereby further sealing the inside of body 40 against the entry of foreign material.

At the opposite end, clamp ring 44 has a similar close fit at 54 with flange 24 so that this end of the cutter assembly is also sealed against foreign matter.

The extreme outer ends of members 12 and 16 may be tapered as indicated at 56 for mounting of the cutter assembly in a bracket 58 having correspondingly spaced recesses so that the cutter assembly will wedge in a bracket provided therefor. However, the outer ends of members 12 and 16 could also be made cylindrical and be supported in a bracket arrangement having cylindrical spaces for receiving the ends of members 12 and 16.

In either case, it may be desirable to provide pins 60 extending through shaft 10 and the supporting bracket to prevent the arms of the supporting bracket from spreading apart and to hold shaft 10 against rotation and these pins could extend through the end parts of members 12 and 16 when these are formed to a cylindrical configuration. Other arrangements for preventing rotation of the stationary part of the structure will suggest themselves to those skilled in the art.

The arrangement of the present invention proposes the provision on body 40 of any desired configuration together with the inclusion of hard facing or hard inserts, of cemented carbide such as tungsten carbide, for example, but inasmuch as the particular outer configuration of body 40, and of any inserts mounted therein, it is not part of the present invention, and body 40 is merely shown in outline.

In practice, the plurality of cutters of the nature shown in the drawing are mounted on a rotary head of suitable size and strength and are presented to a formation to be reduced and pressed against a formation while the head is rotated. The cutter bodies will thus roll on the formation and reduce the formation by crushing or cutting so that the head will progress through the formation and form a hole therein of the desired size.

The cutter arrangement of the present arrangement is extremely strong, even though substantial space is occupied by the antifriction bearings, because of the strength of member 12, and because the body 40 is strongly supported on the antifriction bearings, particularly in view of heavy one piece outer race ring 38.

The cutter arrangement according to the present invention thus rolls relatively freely, and has long life, and, inasmuch as the bearing races are made as parts independent of the remainder of the structure of the cutter body, the inner supporting parts 12 and 16 and the bearings can be reused after the cutter body is worn down to the point that it must be discarded.

In those cutter arrangements where the races are formed directly on the inner supporting structure and on the inside of the cutter body, the wear that takes place on the bearing races prevents reuse of these parts to the same extent that the inner parts of the cutter arrangement of the present invention can be reused.

Modifications may be made within the scope of the appended claims.

What is claimed is:

1. In a cutter for use in the excavation of a formation; a non-rotatable central support structure, a cutter body coaxial with and surrounding said central support structure, an antifriction bearing arrangement interposed between said central support structure and said cutter body and rotatably and nonaxially moveably supporting the cutter body on the central support structure, said antifriction bearing arrangement comprising a pair of rows of tapered rollable elements in axially spaced relation, a pair of rings engaging the radially inner sides of said elements and forming tapered races therefor, a single ring engaging the outer sides of both rows of said elements and forming tapered races therefor, said pair of rings being nonrotatably fixed to said central support structure, said single ring being fixed to said cutter body, said single ring having a cylindrical outer surface, said cutter body having a shouldered cylindrical bore in which said single ring is mounted, a clamp ring on said cutter body clamping said single ring in place therein, said pair of rings being mounted in spaced relation on said central supporting structure, said central supporting structure comprising a first tubular shaft element having a flange at one end facing the other end thereof, a second shaft element telescopically and adjustably mounted in said other end of said first shaft element and having a flange facing the said one end of said first element, and spacer elements on said first shaft element disposed between said flanges and the outer sides of said pair of rings and between the inner sides of said pair of rings for clamping said pair of rings in fixed spaced relation on said first shaft element.

2. A cutter according to claim 1 in which said flanges having cylindrical outer surfaces, and cylindrical bores in said clamp ring and in the end of said cutter body opposite said clamp ring, each of said cylindrical bores being coplanar with and having a close running fit with the said outer surface of the adjacent one of said flanges.

3. A cutter according to claim 2 which includes seal means interposed between each of said spacer elements which are disposed between said flanges and the outer sides of said pair of rings and the adjacent end of said single ring, each said seal means comprising a rubber-like ring having the radially inner side engaging the pertaining spacer ring, and a support element for each rubber-like ring fixed to the adjacent end of said single ring and engaging the radially and axially outer sides of the respective rubber-like ring.

4. A cutter according to claim 1 in which each shaft element at the extreme axially outer end thereof has a dovetail configuration in cross section so as to be receivable in a support saddle having spaced parallel legs with opposed dovetail slots therein.

5. A cutter according to claim 1 in which said shaft elements are provided with interengaging threads for relative axial adjustment of said flanges.

6. A cutter according to claim 1 in which said first shaft element is internally threaded at said other end, said second shaft element having external threads engaging said internal threads, a circular axial flange on said other end of said first shaft element, and a circular axial recess in said second shaft element snugly receiving said flange.

7. A cutter according to claim 1 in which both of said shaft elements are tubular, and a central shaft extending through said shaft elements.

* * * * *